US012803374B2

(12) United States Patent
Nakatomi

(10) Patent No.: US 12,803,374 B2
(45) Date of Patent: Nov. 17, 2026

(54) ROTATING MACHINE

(71) Applicant: HONDA MOTOR CO., LTD., Tokyo (JP)

(72) Inventor: Tsubasa Nakatomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 19/022,211

(22) Filed: Jan. 15, 2025

(65) Prior Publication Data

US 2025/0266737 A1 Aug. 21, 2025

(30) Foreign Application Priority Data

Feb. 21, 2024 (JP) ................................ 2024-024768

(51) Int. Cl.

| | |
|---|---|
| ***H02K 9/193*** | (2006.01) |
| ***H02K 1/28*** | (2006.01) |
| ***H02K 1/32*** | (2006.01) |
| ***H02K 5/20*** | (2006.01) |
| ***H02K 7/00*** | (2006.01) |
| ***H02K 7/14*** | (2006.01) |

(52) U.S. Cl.
CPC ............... *H02K 7/003* (2013.01); *H02K 1/32* (2013.01); *H02K 7/14* (2013.01)

(58) Field of Classification Search
CPC ............ H02K 7/003; H02K 1/32; H02K 7/14; H02K 9/19
See application file for complete search history.

(56) References Cited

U.S. PATENT DOCUMENTS

| | | | | |
|---|---|---|---|---|
| 2015/0288255 | A1 | 10/2015 | Barker et al. | |
| 2022/0052578 | A1 | 2/2022 | Cross | |
| 2022/0320945 | A1 | 10/2022 | Yazaki et al. | |
| 2023/0179065 | A1 * | 6/2023 | Wu ........................ | H02K 9/193 |
| 2023/0291260 | A1 | 9/2023 | Sawahata et al. | |

FOREIGN PATENT DOCUMENTS

| | | | |
|---|---|---|---|
| JP | 2022-157784 | A | 10/2022 |
| JP | 2022-045542 | A | 3/2023 |

* cited by examiner

*Primary Examiner* — Joseph Ortega
(74) *Attorney, Agent, or Firm* — Rankin, Hill & Clark LLP

(57) ABSTRACT

A first rotating shaft of a rotating machine has a first engaging portion disposed at a first connecting end portion. A second engaging portion is disposed at a second connecting end portion of a second rotating shaft of the rotating machine. In the diametrical direction of the first connecting end portion, the first connecting end portion and the second connecting end portion overlap each other, and the second engaging portion is slidably engaged with the first engaging portion. A lubricant flow path is formed between the first engaging portion and the second engaging portion.

13 Claims, 4 Drawing Sheets

10(100)

ROTATING MACHINE

CROSS-REFERENCE TO RELATED APPLICATIONS

This application is based upon and claims the benefit of priority from Japanese Patent Application No. 2024-024768 filed on Feb. 21, 2024, the contents of which are incorporated herein by reference.

BACKGROUND OF THE INVENTION

Field of the Invention

The present invention relates to a rotating machine having a first rotating body and a second rotating body.

Description of the Related Art

A rotating electric machine rotor has a rotating shaft and permanent magnets retained by the rotating shaft. In a rotating electric machine, the temperature of the permanent magnets becomes high as the rotating electric machine rotor rotates. In view of the above, JP 2022-045542 A proposes a method of cooling permanent magnets by supplying a cooling medium into a hollow interior of a rotating shaft.

A combined power system as a rotating machine may be configured by combining a rotating electric machine and a gas turbine engine. In the combined power system, one end of the rotating shaft of a turbine rotor in the axial direction thereof is connected to one end of the rotating shaft of the rotating electric machine rotor in the axial direction thereof. Therefore, the rotating electric machine rotor and the turbine rotor rotate together integrally.

SUMMARY OF THE INVENTION

There may be a case where lubrication is required at a connected part between a rotating shaft of a rotating electric machine rotor and a rotating shaft (output shaft) of a turbine rotor. Accordingly, in the case that a rotating machine is configured by combining a gas turbine engine and the rotating electric machine having the configuration described in JP 2022-045542 A, it is necessary to supply a lubricant to a connected part of the two rotating shafts while supplying a cooling medium to the rotating shaft of the rotating electric machine rotor. Therefore, in the case that the rotating machine is configured by including the cooling medium supply device and the lubricant supply device, the configuration of the rotating machine is complicated.

An object of the present invention is to solve the aforementioned problem.

An aspect of the present disclosure is characterized by a rotating machine including a first rotating body including a first rotating shaft, and a second rotating body including a second rotating shaft configured to rotate integrally with the first rotating shaft. The first rotating shaft includes a cooling medium flow path through which a liquid cooling medium flows, a liquid feed path communicating with the cooling medium flow path, and a first engaging portion provided at a first connecting end portion that is one end portion of the first rotating shaft in an axial direction of the first rotating shaft. The second rotating shaft includes a second connecting end portion overlapping the first connecting end portion in a diametrical direction of the first connecting end portion, and a second engaging portion provided at the second connecting end portion. The first engaging portion and the second engaging portion form a connecting portion configured to transmit the rotational driving force between the first rotating shaft and the second rotating shaft.

The second engaging portion is engaged with the first engaging portion so as to be relatively slidable in the axial direction. A lubricant flow path is formed between the first engaging portion and the second engaging portion that are engaged with each other, the lubricant flow path communicating with the liquid feed path and through which the liquid cooling medium is allowed to pass as a lubricant. The liquid feed path is interposed between the cooling medium flow path and the lubricant flow path.

According to the present invention, the liquid cooling medium for cooling the first rotating body can also be used as a lubricant for lubricating the connecting portion between the first rotating shaft and the second rotating shaft.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
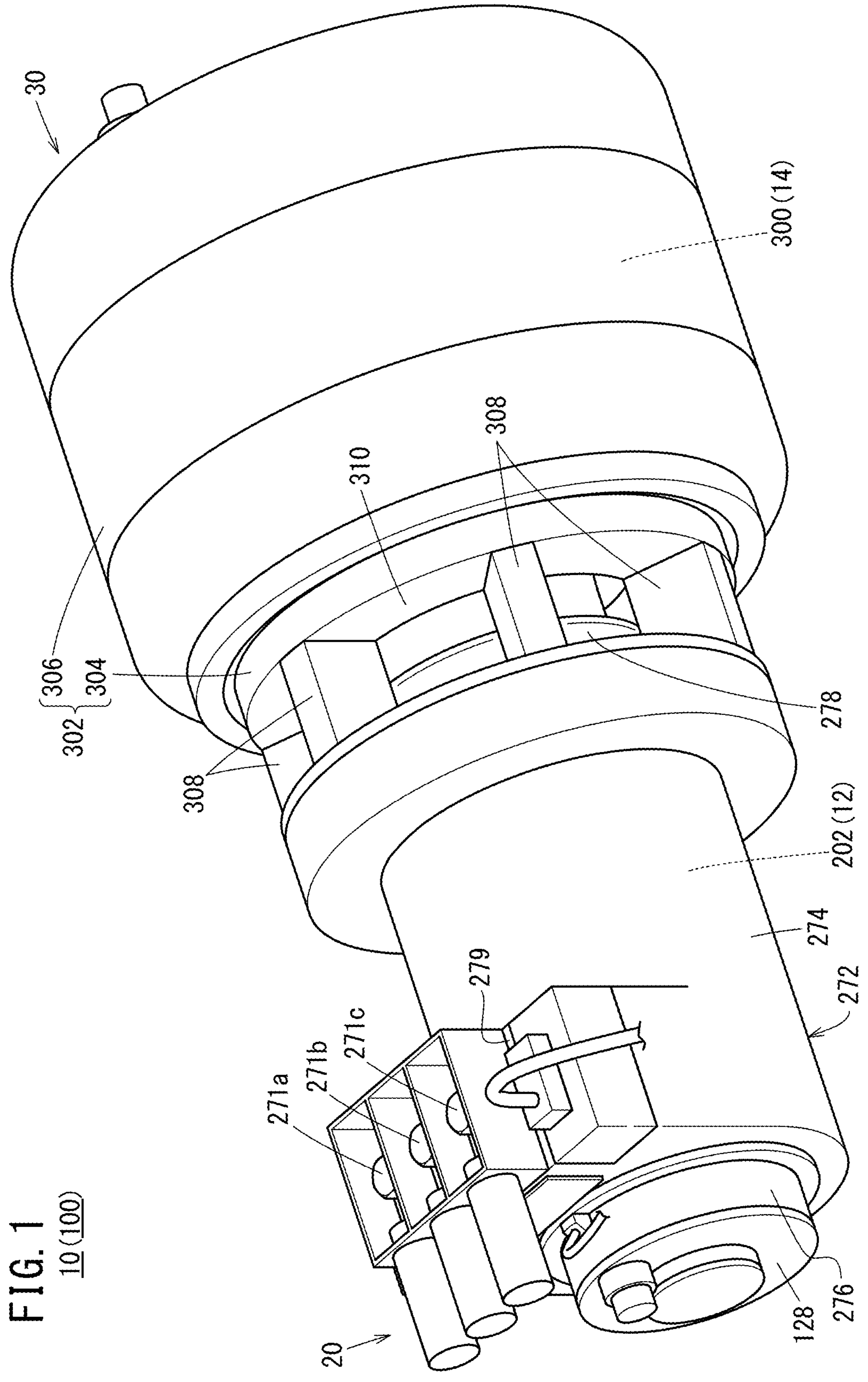
FIG. 1 is a schematic overall perspective view of a rotating machine (combined power system) according to an embodiment of the present invention.

In the following description, a combined power system 100 shown in FIG. 1 is exemplified as a rotating machine 10. In this case, a rotating electric machine rotor 202 shown in FIG. 2 corresponds to a first rotating body 12, and a turbine rotor 300 corresponds to a second rotating body 14. However, this is merely an example, and the rotating machine 10 is not limited to the combined power system 100. Although not shown, another example of the rotating machine 10 includes a rotary vane. In this case, the rotating electric machine rotor 202 corresponds to the first rotating body 12, and a propeller or a fan corresponds to the second rotating body 14.

In the following, a cooling oil CO is exemplified as a liquid cooling medium RF. However, the liquid cooling medium RF is not limited to the cooling oil CO. The liquid cooling medium RF may be an organic solvent with a high boiling point and low volatility.

Figure 2:
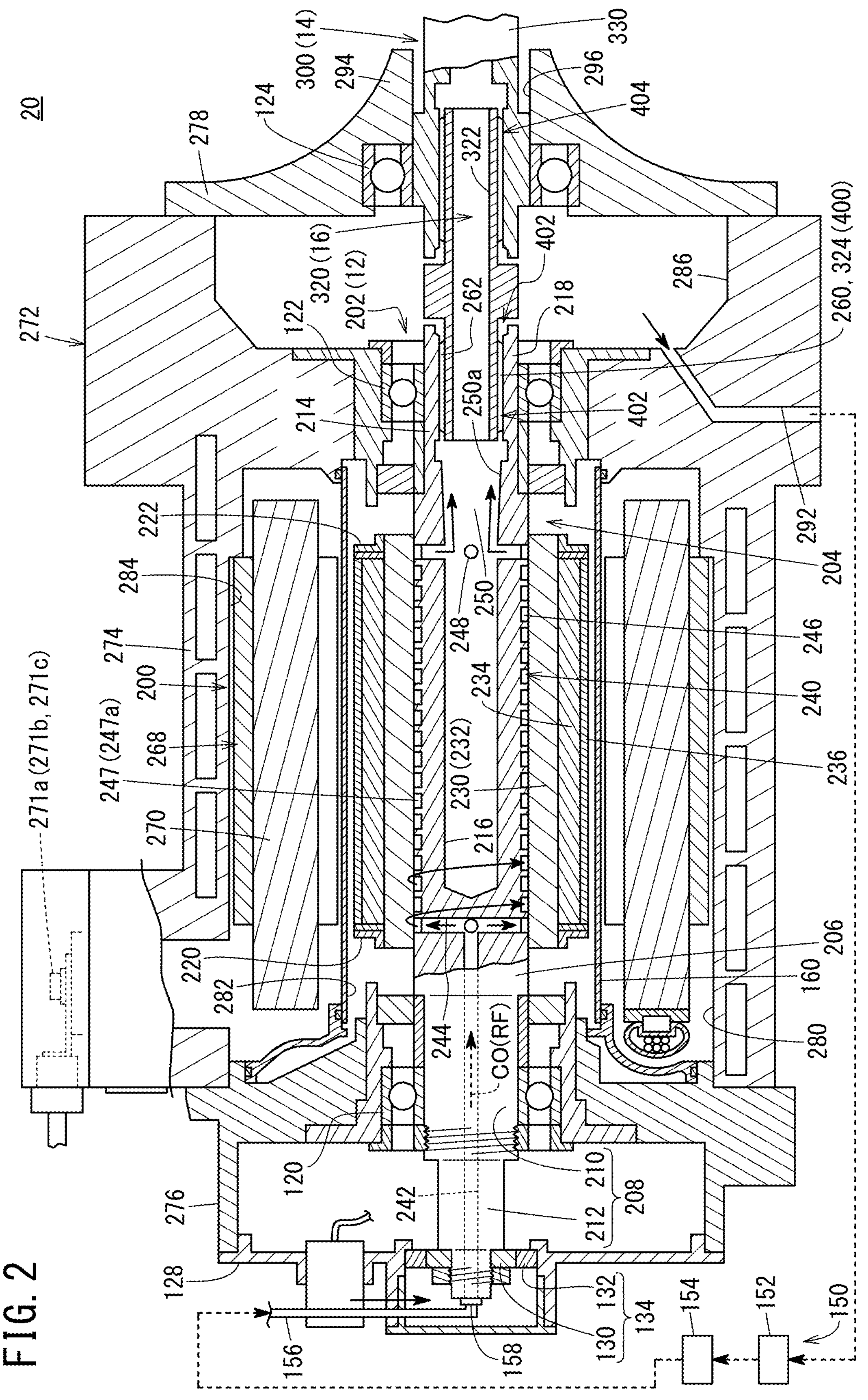
FIG. 2 is a schematic cross-sectional side view when the combined power system in FIG. 1 is observed in a direction perpendicular to an axial direction.
Figure 3:
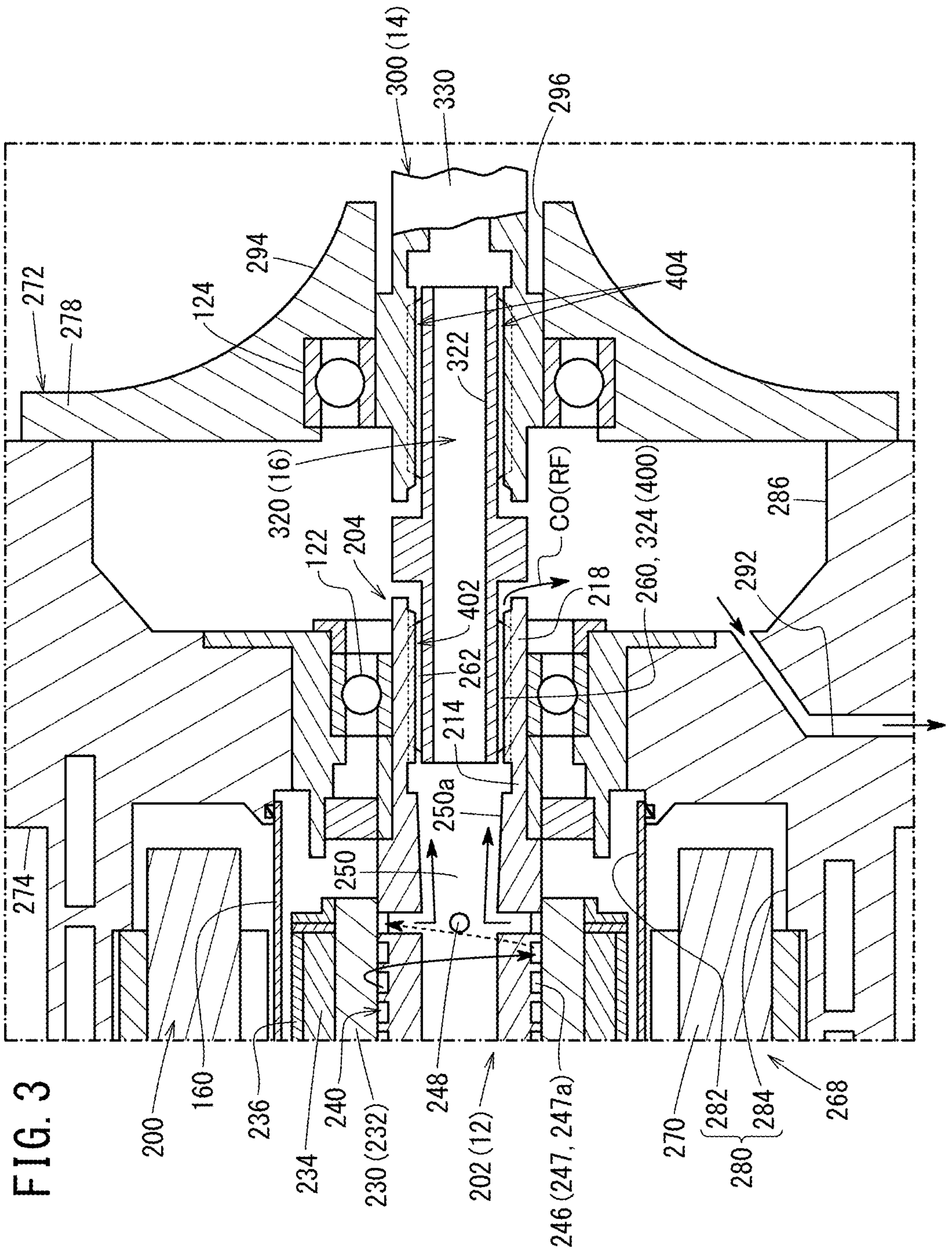
FIG. 3 is an enlarged cross-sectional side view of principal components, illustrating the vicinity of a connected part between the first rotating shaft and the second rotating shaft (connecting shaft) in the combined power system of FIG. 1.
Figure 4:
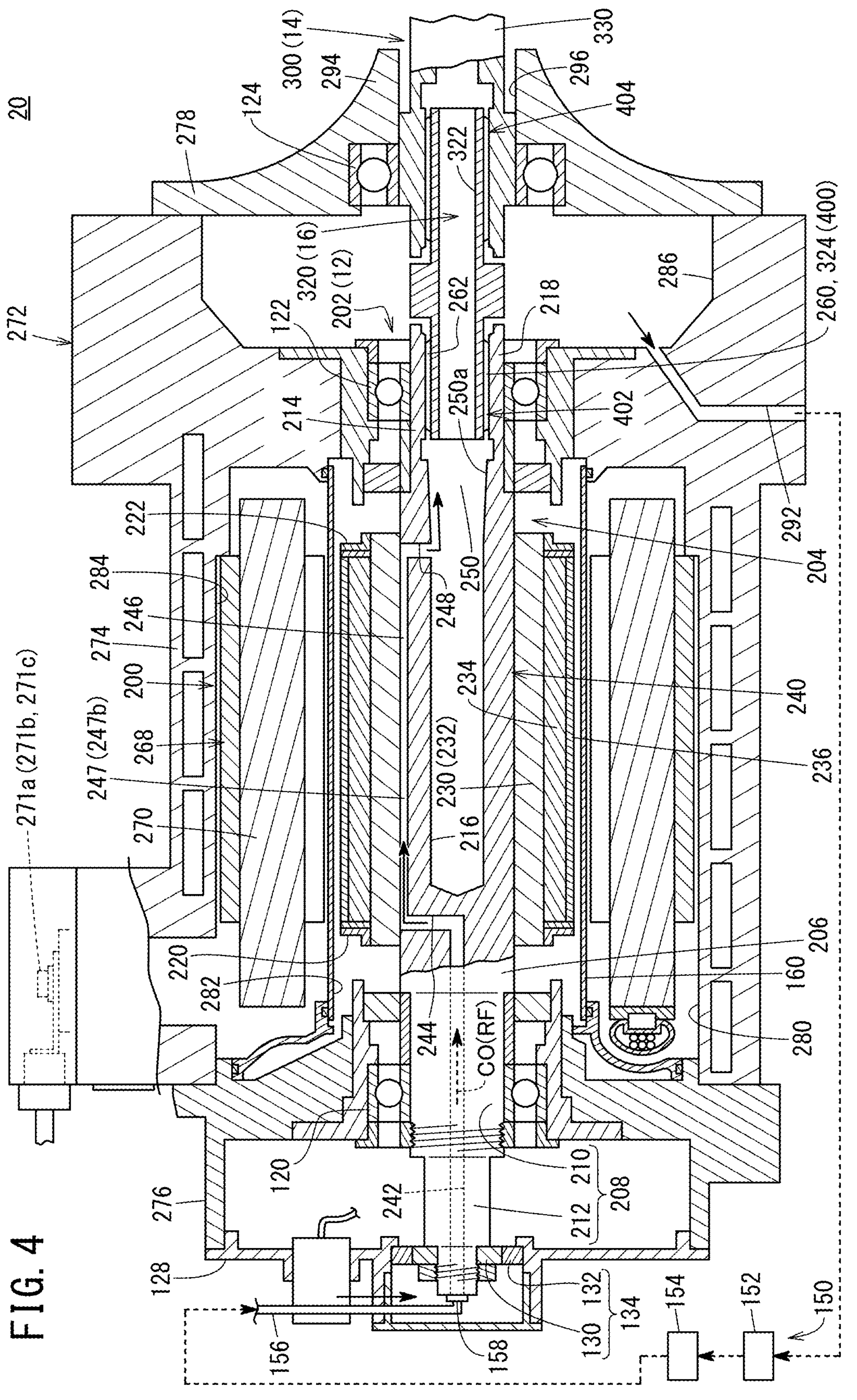
FIG. 4 is a schematic cross-sectional side view illustrating a cooling medium flow path in an aspect different from that of FIG. 2.

Further, the respective terms “left”, “right”, “lower”, and “upper” refer specifically to the left, right, lower and upper directions shown in FIG. 2 to FIG. 4. However, these directions are provided for the sake of convenience in order to simplify the description and facilitate understanding. In particular, the directions described in the specification are not limited to the directions when the combined power system 100 is actually used.

FIG. 1 is a schematic overall perspective view of the combined power system 100, which is one example of the rotating machine 10. The combined power system 100 includes a rotating electric machine system 20 and a gas turbine engine 30. An axis of the rotating electric machine system 20 coincides with an axis of the gas turbine engine 30. Stated otherwise, the rotating electric machine system 20 and the gas turbine engine 30 are arranged on the same axis.

The combined power system 100 is used, for example, as a power source for providing propulsion in a flying object, a ship, an automobile, or the like. Suitable specific examples of the flying object include a drone and a multi-copter. The combined power system 100, when mounted on a flying object, is used as a power drive source for rotating, for example, a prop, a ducted fan, or the like. The combined power system 100, when mounted on a ship, is used as a screw rotational force generating device. The combined power system 100, when mounted on an automobile, is used as a power drive source for rotating a motor.

The combined power system 100 can also be used as an auxiliary power source in an aircraft, a ship, a building, or the like. Apart therefrom, it is also possible to utilize the combined power system 100 as gas turbine power generation equipment.

A description will be given concerning the rotating electric machine system 20. As shown in FIG. 2, the rotating electric machine system 20 includes a rotating electric machine 200 and a rotating electric machine housing 272 that accommodates the rotating electric machine 200. The rotating electric machine housing 272 has a main housing 274 that exhibits a substantially cylindrical shape, and includes open opposite ends in the axial direction. The rotating electric machine housing 272 further includes a first sub-housing 276 connected to the left end of the main housing 274 and a second sub-housing 278 connected to the right end of the main housing 274.

The rotating electric machine 200 includes the rotating electric machine rotor 202, and a stator 268 that surrounds an outer circumferential side of the rotating electric machine rotor 202. In the combined power system 100, the rotating electric machine 200 is typically a generator. In the above-mentioned rotary vane, the rotating electric machine 200 is typically a motor. In this manner, the rotating electric machine 200 can function as a generator or a motor.

The rotating electric machine rotor 202 includes a first rotating shaft 204. The first rotating shaft 204 has a large diameter portion 206, a first end 208 positioned on the left side of the large diameter portion 206, and a second end 214 positioned on the right side of the large diameter portion 206. The large diameter portion 206 is a portion of the first rotating shaft 204 having the largest outer diameter. The first end 208 has a medium diameter portion 210 continuous with the left of the large diameter portion 206, and a small diameter portion 212 continuous with the left of the medium diameter portion 210. The medium diameter portion 210 is rotatably supported by a first bearing 120. The small diameter portion 212 is positioned further on the left side than the first bearing 120 and extends in the interior of the first sub-housing 276. The outer diameter of the second end 214 is substantially equal to the outer diameter of the medium diameter portion 210.

A resolver rotor 130 is attached to the small diameter portion 212. The resolver rotor 130 rotates integrally with the first rotating shaft 204. A resolver holder 128 is attached to the first sub-housing 276. A resolver stator 132 is retained on the resolver holder 128. The resolver rotor 130 and the resolver stator 132 constitute a resolver 134. For example, the resolver 134 detects an angle of rotation of the first rotating shaft 204.

The large diameter portion 206 has a hollow shape having an inner hole 216. A cover member 230 is positioned and fixed to the large diameter portion 206. In the illustrated example, the cover member 230 is a sleeve 232. A first collar 220 and a second collar 222 are positioned and fixed to the left end and the right end of the sleeve 232, respectively. A magnet holder 234 is sandwiched between the first collar 220 and the second collar 222. The sleeve 232 is positioned further inward than the magnet holder 234 in the diametrical direction of the rotating electric machine rotor 202, and covers the large diameter portion 206 of the first rotating shaft 204. The sleeve 232 may be omitted, and the large diameter portion 206 may be covered with the thick magnet holder 234. In this case, the magnet holder 234 corresponds to the cover member 230.

A plurality of permanent magnets 236 are retained on the outer circumferential surface of the magnet holder 234. The sleeve 232, which is the cover member 230, the magnet holder 234, and the plurality of permanent magnets 236 constitute the rotating electric machine rotor 202 together with the first rotating shaft 204.

The second end 214 is rotatably supported by a second bearing 122. The second end 214 includes a first connecting end portion 218. The first connecting end portion 218 is one end in the axial direction of the first rotating shaft 204. The first connecting end portion 218 will be described later. The second end 214 is hollow.

The first rotating shaft 204 has a cooling medium flow path 240 through which the cooling oil CO flows, and a liquid feed path 250. In the illustrated example, the cooling medium flow path 240 includes a first flow path 242, a communication path 244, a second flow path 246, and a relay path 248. The first flow path 242 extends in the axial direction of the first rotating shaft 204, for example, at the diametrical center of the first end 208. One end (left end) of the first flow path 242 in the axial direction is opened at the distal end surface of the first end 208. Another end (right end) of the first flow path 242 in the axial direction extends to the large diameter portion 206 and is connected to the communication path 244.

The second flow path 246 is formed by covering an outer groove 247 with the sleeve 232. Specifically, the outer groove 247 is formed as a helical groove 247*a* on the outer circumferential surface of the large diameter portion 206. As the helical groove 247*a* is covered with the sleeve 232, the helical second flow path 246 is formed between the large diameter portion 206 and the sleeve 232.

The second flow path 246 is not limited to a helical flow path. As shown in FIG. 4, the outer groove 247 may be a straight groove 247*b* extending linearly in the axial direction of the first rotating shaft 204. In this case, the second flow path 246 is a flow path extending linearly in the axial direction of the first rotating shaft 204. Although FIG. 4 shows one straight groove 247*b*, a plurality of straight grooves 247*b* may be used.

In the large diameter portion 206, the communication path 244 extends from the interior of the first rotating shaft 204 in the diametrical direction toward the outer circumferential surface thereof, and places the first flow path 242 and the second flow path 246 in communication with each other. In the illustrated example, the first rotating shaft 204 has the plurality of communication paths 244. The plurality of communication paths 244 are in the form of holes extending radially from the center toward the outer circumferential surface in the diametrical direction of the large diameter portion 206. The communication paths 244 and the inner hole 216 are not directly connected.

In the large diameter portion 206, the relay path 248 extends from the interior of the first rotating shaft 204 in the diametrical direction toward the outer circumferential surface thereof, and places the second flow path 246 and the liquid feed path 250 in communication with each other. In the illustrated example, the first rotating shaft 204 has the plurality of relay paths 248. The plurality of relay paths 248 are in the form of holes extending radially from the center toward the outer circumferential surface in the diametrical direction of the large diameter portion 206. The inner hole 216 and the liquid feed path 250 are separated by the relay paths 248.

The liquid feed path 250 is a space formed in the interior of the large diameter portion 206 and is connected to the right portion of the inner hole 216. The liquid feed path 250 extends toward the second end 214 in the axial direction of the first rotating shaft 204. One end (right end) of the liquid feed path 250 in the axial direction is positioned at the second end 214. The inner diameter of the liquid feed path 250 gradually increases from the relay paths 248 toward the first connecting end portion 218. In other words, an inner circumferential surface 250*a* of the liquid feed path 250 is a tapered surface whose diameter decreases from the first connecting end portion 218 toward the relay paths 248.

The internal space of the first connecting end portion 218 is continuous with the right portion of the liquid feed path 250. A first engaging portion 260 is provided on the inner circumferential surface of the first connecting end portion 218. In the internal space of the first connecting end portion 218, a second connecting end portion 322 constituting a second rotating shaft 16 of the turbine rotor 300 is inserted. In the illustrated example, the second rotating shaft 16 is a connecting shaft 320 interposed between the first rotating shaft 204 and an output shaft 330 of the gas turbine engine 30, and one end portion (right end portion) of the connecting shaft 320 in the axial direction is the second connecting end portion 322. Alternatively, the output shaft 330 may be connected to the first rotating shaft 204. In this case, the output shaft 330 corresponds to the second rotating shaft 16, and one end portion (left end portion) of the output shaft 330 in the axial direction corresponds to the second connecting end portion 322.

A second engaging portion 324 is provided on the outer circumferential surface of the second connecting end portion 322. The first rotating shaft 204 and the connecting shaft 320 are connected to each other by the second engaging portion 324 engaging with the first engaging portion 260. In the illustrated example, the second engaging portion 324 overlaps the first engaging portion 260 on the inner side of the first engaging portion 260 in the diametrical direction of the first connecting end portion 218. The first engaging portion 260 and the second engaging portion 324 are a connecting portion 400 for transmitting a rotational driving force between the first rotating shaft 204 and the connecting shaft 320.

The engagement between the first engaging portion 260 and the second engaging portion 324 is, for example, spline connection 402. In this case, the second engaging portion 324 is slidable relative to the first engaging portion 260 in the axial direction of the first rotating shaft 204. The first engaging portion 260 and the second engaging portion 324 may be engaged with each other by engagement other than the spline connection 402 as long as the second engaging portion 324 is slidable relative to the first engaging portion 260 in the axial direction.

A lubricant flow path 262 is formed between the first engaging portion 260 and the second engaging portion 324 which overlap each other in the diametrical direction. As understood from this, the lubricant flow path 262 is a clearance that is formed between the inner circumferential surface of the first connecting end portion 218 and the outer circumferential surface of the second connecting end portion 322, communicates with the liquid feed path 250, and extends in the axial direction of the first rotating shaft 204. The cooling oil CO passes through the lubricant flow path 262 as a lubricant.

Contrary to the illustrated example, the second connecting end portion 322 may be hollow, and the first connecting end portion 218 may be inserted into the interior of the second connecting end portion 322. In this case, the first engaging portion 260 is formed on the outer circumferential surface of the first connecting end portion 218, and the second engaging portion 324 is formed on the inner circumferential surface of the second connecting end portion 322. The second engaging portion 324 overlaps the exterior of the first engaging portion 260 in the diametrical direction of the first connecting end portion 218. The lubricant flow path 262 is formed between the outer circumferential surface of the first connecting end portion 218 and the inner circumferential surface of the second connecting end portion 322.

In the present embodiment, an aspect in which the cooling oil CO flows through the cooling medium flow path 240, the liquid feed path 250, and the lubricant flow path 262 in this order will be described. The rotating electric machine system 20 is provided with a cooling medium supply unit 150 for supplying a cooling oil CO to the cooling medium flow path 240. The cooling medium supply unit 150 includes a cooling medium recovery tank 152, a cooling medium supply device 154, and an oil discharge member 156. The cooling medium supply device 154 is, for example, a pump, and pressure-feeds the cooling oil CO toward the cooling medium flow path 240. The oil discharge member 156 is inserted into the internal space of the resolver holder 128. The oil discharge member 156 has a nozzle portion 158 facing the first flow path 242.

An accommodation chamber 280 of the main housing 274 is divided into a rotor chamber 282 and a stator chamber 284 by a cylindrical partition wall member 160. The majority of the components of the rotating electric machine rotor 202 are accommodated in the rotor chamber 282. The stator 268, which constitutes the rotating electric machine 200, is accommodated in the stator chamber 284. The stator 268 includes electromagnetic coils 270. The electromagnetic coils 270 include a U-phase coil, a V-phase coil, and a W-phase coil. In the case that the rotating electric machine 200 is a generator, the rotating electric machine 200 is a so-called three-phase power source.

As shown in FIG. 1, a terminal casing 279 is integrally provided on a side wall in the vicinity of the left end of the main housing 274. In the terminal casing 279, there are accommodated a U-phase terminal 271*a*, a V-phase terminal 271*b*, and a W-phase terminal 271*c* that are electrically connected to ends of a U-phase coil, a V-phase coil, and a W-phase coil, respectively.

The main housing 274 has a substantially cylindrical shape. The left open end of the main housing 274 is closed by the first sub-housing 276. The circular opening at the left end of the first sub-housing 276 is closed by the resolver holder 128.

The main housing 274 has a recess 286 in the right portion thereof. As shown in FIG. 3, the recess 286 is closed by the second sub-housing 278 to form an inner chamber. A drain passage 292 formed in the main housing 274 communicates with the recess 286.

The second sub-housing 278 includes a rectifying member 294 on the right end thereof that faces toward the gas turbine engine 30. The flow rectifying member 294 is of a substantially truncated conical shape, and reduces in diameter in a tapered shape from the main housing 274 toward the gas turbine engine 30. The rectifying member 294 has an insertion hole 296 at the center in the diametrical direction. The output shaft 330 is passed through the insertion hole 296. The left end portion of the output shaft 330 is rotatably supported by a third bearing 124 provided in the interior of the second sub-housing 278.

The rotating electric machine system 20 is basically configured as described above. Moreover, it should be noted that the configuration of the gas turbine engine 30, for example, is similar to the configuration shown in FIG. 8 of JP 2022-157784 A. Therefore, the description of the gas turbine engine 30 will be kept brief.

As shown in FIG. 1, the gas turbine engine 30 includes an engine housing 302. The turbine rotor 300 (see FIG. 2) is accommodated in the interior of the engine housing 302. The engine housing 302 includes an inner housing 304 (see FIG. 1) and an outer housing 306. An inner housing 304 faces toward the second sub-housing 278 of the rotating electric machine system 20. The outer housing 306 is connected to the inner housing 304.

The inner housing 304 has a plurality of individual leg members 308. Air intake spaces 310 are formed between the leg members 308 that are adjacent to each other from among the plurality of leg members 308. A combustor (not shown) is provided in the interior of the outer housing 306.

The turbine rotor 300 of the gas turbine engine 30 includes the connecting shaft 320 as the second rotating shaft 16 and the output shaft 330. As shown in FIGS. 2 and 3, the output shaft 330 is connected to the first rotating shaft 204 via the connecting shaft 320. The right end portion of the connecting shaft 320 and the left end portion of the output shaft 330 are connected to each other via, for example, a spline connection 404.

A non-illustrated compressor wheel and a non-illustrated turbine wheel are retained by the output shaft 330. The compressor wheel and the turbine wheel are capable of rotating integrally together with the first rotating shaft 204, the connecting shaft 320 and the output shaft 330.

Next, a description will be given concerning operations of the combined power system 100.

First, an alternating current is supplied to the electromagnetic coils 270 (the U-phase coil, the V-phase coil, and the W-phase coil) via the U-phase terminal 271*a*, the V-phase terminal 271*b*, and the W-phase terminal 271*c* shown in FIG. 2. Accordingly, the rotating electric machine rotor 202 starts rotating. Alternatively, the rotating electric machine rotor 202 may be rotated by a well-known type of starter (not shown).

The rotational driving force of the first rotating shaft 204 is transmitted to the output shaft 330 via the connecting shaft 320. Accordingly, the turbine rotor 300 rotates integrally with the rotating electric machine rotor 202. In other words, the non-illustrated compressor wheel and the non-illustrated turbine wheel, which are retained on the output shaft 330, rotate integrally together with the output shaft 330. After the turbine rotor 300 starts rotating as described above, the turbine rotor 300 continuously rotates in accordance with the operation of the gas turbine engine 30. Accordingly, even if the supply of the electrical current to the electromagnetic coils 270 is stopped, the rotating electric machine rotor 202 rotates integrally together with the turbine rotor 300.

In this way, the rotating electric machine rotor 202 and the turbine rotor 300 are rotated, and the cooling medium supply device 154 is started. The cooling medium supply device 154 pressure-feeds the cooling oil CO toward the cooling medium flow path 240.

As the rotating electric machine rotor 202 rotates, an alternating current is generated in the electromagnetic coils 270 surrounding the permanent magnets 236. Via the U-phase terminal 271*a*, the V-phase terminal 271*b*, and the W-phase terminal 271*c*, the alternating current is supplied to an external load. The alternating current may be converted into the direct current by a current converter (not shown), and thereafter the direct current may be supplied to the external load.

In the inner housing 304 shown in FIG. 1, as the turbine rotor 300 rotates, the atmospheric air is drawn into the inner side of the leg members 308 through the air intake spaces 310 between the adjacent leg members 308. The atmospheric air flows toward the inner housing 304 along the rectifying member 294 shown in FIGS. 2 and 3 and flows into the interior of the inner housing 304. The atmospheric air in the inner housing 304 is compressed by the compressor wheel. In accordance therewith, the compressed air is generated. The fuel injected into the compressed air is burned in the interior of the outer housing 306.

A portion of the compressed air obtained by the compressor wheel may be supplied to the rotor chamber 282 (see FIG. 2) to cool the rotating electric machine rotor 202. Alternatively, a portion of the compressed air may cool the first bearing 120 and the second bearing 122. In addition, a portion of the compressed air or liquid cooling medium RF may be supplied to the stator chamber 284 to cool the stator 268. A portion of the lubricating oil supplied to the first bearing 120, the second bearing 122, and the third bearing 124 may be used as the liquid cooling medium RF. A portion of the lubricating oil may be supplied to the cooling medium flow path 240 as the cooling oil CO.

The electromagnetic coils 270 generate heat as the electrical current flows therethrough. Accordingly, the permanent magnets 236 facing the electromagnetic coils 270 are exposed to the radiant heat.

As described above, the cooling medium supply device 154 supplies the cooling oil CO toward the cooling medium flow path 240. The cooling oil CO is discharged from the nozzle portion 158 of the oil discharge member 156. Though the first rotating shaft 204 is rotated, the first flow path 242 is provided in the diametrical center of the first rotating shaft 204, and the nozzle portion 158 faces toward the first flow path 242. Therefore, the cooling oil CO discharged from the nozzle portion 158 easily flows into the first flow path 242. Since the cooling medium supply device 154 pressure-feeds the cooling oil CO at a predetermined discharge pressure, the cooling oil CO moves along the first flow path 242 in the first end 208 of the first rotating shaft 204 toward the large diameter portion 206. After reaching the large diameter portion 206, the cooling oil Co flows from the diametrically inward side of the large diameter portion 206 toward the diametrically outward side along the communication paths 244 formed in the large diameter portion 206. In this way, the flow direction of the cooling oil co is changed by the communication paths 244.

The cooling oil CO moves from the communication paths 244 to the second flow path 246. Since the second flow path 246 is formed in a helical shape, the cooling oil CO flowing in the second flow path 246 moves toward the second end 214 of the first rotating shaft 204 while turning in the helical manner. Accordingly, the permanent magnets 236 exposed to the radiant heat of the electromagnetic coils 270 can be cooled uniformly. As described above, according to the present embodiment, the permanent magnets 236 can be efficiently cooled by the cooling oil CO flowing through the cooling medium flow path 240.

The cooling oil CO that has flowed through the second flow path 246 then moves to the relay paths 248. In the relay paths 248, the direction of movement of the cooling oil Co is a direction from the outside to the inside in the diametrical direction of the first rotating shaft 204. Since the first rotating shaft 204 is rotating, a centrifugal force is acting on the cooling oil CO. However, as described above, the cooling oil CO is pressure-fed at a predetermined discharge pressure. Accordingly, the cooling oil CO can flow diametrically inward of the first rotating shaft 204 along the relay paths 248.

The cooling oil CO then moves to the liquid feed path 250. The inner diameter of the liquid feed path 250 gradually increases toward the first connecting end portion 218. That is, the liquid feed path 250 gradually expands toward the first connecting end portion 218. Since the centrifugal force acts on the cooling oil CO, the cooling oil CO is likely to flow along the inner circumferential surface 250*a* of the liquid feed path 250. In addition, the cooling oil CO is pressure-fed at a predetermined discharge pressure. Accordingly, the cooling oil CO easily moves to the first connecting end portion 218 along the inner circumferential surface 250*a* of the liquid feed path 250.

In the liquid feed path 250, the downstream in the flow direction is the right portion. The right portion of the liquid feed path 250 is continuous with the lubricant flow path 262 formed between the inner surface of the first connecting end portion 218 and the outer circumferential surface of the second connecting end portion 322. The cooling oil CO that has flowed through the liquid feed path 250 flows through the lubricant flow path 262.

The first engaging portion 260 is provided on the inner surface of the first connecting end portion 218, and the second engaging portion 324 is provided on the outer circumferential surface of the second connecting end portion 322. The first engaging portion 260 and the second engaging portion 324 are the connecting portion 400 engaged with each other via the spline connection 402 or the like. The connecting portion 400 is located in the lubricant flow path 262. Accordingly, the connecting portion 400 is lubricated by the cooling oil Co flowing through the lubricant flow path 262. When the rotating electric machine rotor 202 and the turbine rotor 300 rotate, the second engaging portion 324 slightly slides relative to the first engaging portion 260. In this sliding, the cooling oil Co plays a role of a lubricant. Therefore, the relative sliding of the second engaging portion 324 with respect to the first engaging portion 260 is smooth.

As described above, according to the present embodiment, the cooling oil CO for cooling the permanent magnets 236 can be used as a lubricant for lubricating the connecting portion 400. In other words, the cooling oil CO can also be used as a lubricant. As described above, the connecting portion 400 is formed as an engaging portion between the first engaging portion 260 of the first rotating shaft 204 and the second engaging portion 324 of the connecting shaft 320 (the second rotating shaft 16).

The cooling oil CO that has flowed through the lubricant flow path 262 is discharged into the inner chamber formed by closing the recess 286 of the main housing 274 with the second sub-housing 278. The cooling oil CO is then discharged to the outside of the rotating electric machine housing 272 through the drain passage 292 formed in the main housing 274. The cooling oil CO is further recovered in the cooling medium recovery tank 152, and then is pressure-fed from the cooling medium supply device 154 to the cooling medium flow path 240. The lubricating oil supplied to the first bearing 120, the second bearing 122, and the third bearing 124 and the cooling oil CO may be recovered in the cooling medium recovery tank 152, and the oil supplied from the cooling medium supply device 154 may be divided into the lubricating oil and the cooling oil CO. In this case, since it is not necessary to separately provide the cooling medium supply device 154 and the lubricating oil supply device, the rotating electric machine system 20 can be simplified.

On the contrary, the cooling oil CO may be circulated through the lubricant flow path 262, the liquid feed path 250, the relay paths 248, the second flow path 246, the communication paths 244, and the first flow path 242 in this order. In this case, the oil discharge member 156 is disposed in the recess 286, and the drain passage 292 is provided in the first sub-housing 276.

The present embodiment exhibits the following advantageous effects.

As shown in FIG. 2, in the combined power system 100 that is the rotating machine 10, the first rotating shaft 204 of the rotating electric machine rotor 202 (first rotating body 12) includes the cooling medium flow path 240, the liquid feed path 250, and the first engaging portion 260. In the turbine rotor 300 (second rotating body 14), the connecting shaft 320 that is the second rotating shaft 16 includes the second engaging portion 324 engaged with the first engaging portion 260. When the first engaging portion 260 and the second engaging portion 324 are engaged with each other, the lubricant flow path 262 is formed between the first engaging portion 260 and the second engaging portion 324. The lubricant flow path 262 communicates with the cooling medium flow path 240 via the liquid feed path 250.

The cooling oil CO as the liquid cooling medium RF flows through the cooling medium flow path 240. In particular, the permanent magnets 236 constituting the rotating electric machine rotor 202 are cooled by the cooling oil CO. The cooling oil CO moves to the lubricant flow path 262 through the liquid feed path 250, and functions as a lubricant for the first engaging portion 260 and the second engaging portion 324. Alternatively, the cooling oil CO moves from the lubricant flow path 262 to the cooling medium flow path 240 through the liquid feed path 250. In this case, the cooling oil CO functions as a lubricant and thereafter cools the permanent magnets 236.

As described above, according to the present embodiment, the cooling oil CO for cooling the rotating electric machine rotor 202 (particularly the permanent magnets 236) can also be used as a lubricant for lubricating the connecting portion 400 engaged with each other in the first rotating shaft 204 and the second rotating shaft 16. Accordingly, it is not necessary to include a supply device for supplying the cooling oil CO and a supply device for supplying the lubricant separately in the rotating electric machine system 20. Therefore, the configuration of the rotating electric machine system 20 can be simplified. In addition, the relative sliding of the second engaging portion 324 with respect to the first engaging portion 260 is smooth due to the lubricant.

In an exemplary aspect, the engagement of the first engaging portion 260 and the second engaging portion 324 is the spline connection 402. The lubricant can provide good lubrication of the spline connection 402.

The liquid feed path 250 is formed in the interior of the second end 214, which is one end in the axial direction of the first rotating shaft 204. The second end 214 includes the hollow first connecting end portion 218. The connecting shaft 320 includes the second connecting end portion 322 at one end thereof in the axial direction. The second connecting end portion 322 is inserted into the hollow first connecting end portion 218. In this configuration, the first engaging portion 260 is formed on the inner circumferential surface of the first connecting end portion 218, and the second engaging portion 324 is formed on the outer circumferential surface of the second connecting end portion 322.

By making the liquid feed path 250 continuous with the interior of the first connecting end portion 218, it is possible to place the liquid feed path 250 and the lubricant flow path 262 in communication with each other easily.

The cooling medium flow path 240 includes the first flow path 242, the second flow path 246, the communication paths 244, and the relay paths 248. The first flow path 242 is formed in the interior of the other end (first end 208) of the first rotating shaft 204 in the axial direction. The second flow path 246 is formed in a side portion of the first rotating shaft 204. The communication paths 244 place the first flow path 242 and the second flow path 246 to communicate with each other. The relay paths 248 place the second flow path 246 and the liquid feed path 250 in communication with each other. The communication paths 244 and the relay paths 248 extend from the inside in the diametrical direction of the first rotating shaft 204 toward the outer circumferential surface of the first rotating shaft 204.

In accordance with such a configuration, it is easy to cause the cooling oil CO to flow from the cooling medium flow path 240 toward the engaging portion between the first engaging portion 260 and the second engaging portion 324, or in the opposite direction thereto.

The first rotating body 12 includes the cover member 230 covering the outer circumference of the first rotating shaft 204. In the above aspect, the cover member 230 is the sleeve 232. The first rotating shaft 204 includes the outer groove 247 in the outer circumferential surface thereof. The second flow path 246 is formed by covering the outer groove 247 with the sleeve 232.

The first flow path 242, the communication paths 244, the relay paths 248, and the liquid feed path 250 are formed in the interior of the first rotating shaft 204, and the outer groove 247 forming the second flow path 246 is covered with the sleeve 232. Therefore, the cooling oil CO is prevented from being mixed with foreign substance. Further, since the second flow path 246 is close to the permanent magnets 236, the permanent magnets 236 can be sufficiently cooled.

In one aspect, the outer groove 247 is the helical groove **247*a* that turns in a helical shape in the outer circumferential surface of the first rotating shaft 204. Therefore, the cooling oil co turns in a helical manner when flowing through the second flow path 246. Consequently, the permanent magnets 236** can be cooled uniformly.

The inner diameter of the liquid feed path 250 gradually increases as the liquid feed path 250 comes closer to the first engaging portion 260. Since the centrifugal force acts on the cooling oil CO flowing through the liquid feed path 250 as the first rotating shaft 204 rotates, the cooling oil CO easily moves toward the first engaging portion 260 along the inner circumferential surface in the liquid feed path 250. Accordingly, it is easy to supply the cooling medium to the lubricant flow path 262.

The combined power system 100 is provided with the cooling medium supply device 154 for pressure-feeding the cooling oil CO. The cooling medium supply device 154 applies pressure to the cooling oil CO and supplies the cooling oil CO to the cooling medium flow path 240 or the lubricant flow path 262. Accordingly, the cooling oil CO can move from the outer circumferential surface of the first rotating shaft 204 to the interior thereof against the centrifugal force. Therefore, the degree of freedom in the flow direction of the cooling oil co is large. Therefore, the degree of freedom in the shape of the cooling medium flow path 240 and the like is increased.

In an exemplary aspect, the cooling medium supply device 154 pressure-feeds the cooling oil CO so as to move the cooling oil CO from the cooling medium flow path 240 toward the lubricant flow path 262.

The pressure loss in the cooling medium flow path 240 is smaller than the pressure loss in the lubricant flow path 262. Therefore, when the cooling oil CO is caused to flow in the above-described direction, the cooling oil CO moves more smoothly than when the liquid cooling medium RF is caused to flow from the lubricant flow path 262 toward the cooling medium flow path 240.

The second rotating body 14 is the turbine rotor 300 constituting the gas turbine engine 30.

In this configuration, when the turbine rotor 300 rotates, the rotational driving force of the turbine rotor 300 is transmitted to the first rotating shaft 204. Therefore, the rotating electric machine rotor 202 rotates integrally with the turbine rotor 300, and power generation occurs in the rotating electric machine 200.

The output shaft 330 of the turbine rotor 300 is connected to the first rotating shaft 204 via the connecting shaft 320 as the second rotating shaft 16. Since the connecting shaft 320 serves as a spacer, the output shaft 330 can be connected to the first rotating shaft 204 while the rotating electric machine housing 272 is prevented from interfering with the engine housing 302.

In an exemplary aspect, the cooling oil Co is used as the liquid cooling medium RF. The oil sufficiently reduces the frictional resistance between the first engaging portion 260 and the second engaging portion 324 and sufficiently cools the first engaging portion 260 and the second engaging portion 324. That is, oil is suitable as the liquid cooling medium RF having both the lubricating action and the cooling action.

The following supplementary notes are further disclosed in relation to the above-described embodiments.

Supplementary Note 1

The rotating machine (10) according to the present disclosure is equipped with the first rotating body (12) including the first rotating shaft (204), and the second rotating body (14) including the second rotating shaft (16) configured to rotate integrally with the first rotating shaft. The first rotating shaft includes the cooling medium flow path (240) through which the liquid cooling medium (RF) flows, the liquid feed path (250) communicating with the cooling medium flow path, and the first engaging portion (260) provided at the first connecting end portion (218) that is one end portion of the first rotating shaft in an axial direction of the first rotating shaft. The second rotating shaft includes the second connecting end portion (322) overlapping the first connecting end portion in the diametrical direction of the first connecting end portion, and the second engaging portion (324) provided at the second connecting end portion.

The first engaging portion and the second engaging portion form the connecting portion (400) configured to transmit the rotational driving force between the first rotating shaft and the second rotating shaft. The second engaging portion is engaged with the first engaging portion so as to be relatively slidable in the axial direction. The lubricant flow path (262) is formed between the first engaging portion and the second engaging portion that are engaged with each other, the lubricant flow path communicating with the liquid feed path and through which the liquid cooling medium is allowed to pass as the lubricant. The liquid feed path is interposed between the cooling medium flow path and the lubricant flow path.

In accordance with such a configuration, the liquid cooling medium for cooling the first rotating body can also serve as a lubricant for lubricating the connected part between the first rotating shaft and the second rotating shaft (the engagement part between the first engaging portion and the second engaging portion).

Supplementary Note 2

In the rotating machine according to the supplementary note 1, the first engaging portion and the second engaging portion may be engaged by the spline connection (402).

In this case, the spline connection can be lubricated well.

Supplementary Note 3

In the rotating machine according to the supplementary note 1 or 2, the liquid feed path may be formed in the interior of the one end portion of the first rotating shaft, the first connecting end portion may be hollow, the second connecting end portion may be inserted into the first connecting end portion, the first engaging portion may be formed on the inner circumferential surface of the first connecting end portion, and the second engaging portion may be formed on the outer circumferential surface of the second connecting end portion.

In accordance with such a configuration, it is easy to place the liquid feed path and the lubricant flow path in communication with each other.

Supplementary Note 4

In the rotating machine described in the supplementary note 3, the cooling medium flow path may include the first flow path (242) formed in the interior of the other end portion of the first rotating shaft in the axial direction, the second flow path (246) formed in the side portion of the first rotating shaft, the communication path (244) placing the first flow path and the second flow path in communication with each other, and the relay path (248) placing the second flow path and the liquid feed path in communication with each other, and the communication path and the relay path may extend from the inside toward the outer circumferential surface of the first rotating shaft in the diametrical direction of the first rotating shaft.

It is easy to cause the liquid cooling medium to flow from the cooling medium flow path toward the connected part between the first rotating shaft and the second rotating shaft or in the opposite direction thereto.

Supplementary Note 5

In the rotating machine described in the supplementary note 4, the first rotating body may include the cover member (230) covering the outer circumference of the first rotating shaft, the first rotating shaft including the outer groove (247) in the outer circumferential surface, and the second flow path may be formed by covering the outer groove with the cover member.

The cover member and the members around the cover member can be cooled by the liquid cooling medium flowing through the second flow path.

Supplementary Note 6

In the rotating machine described in the supplementary note 5, the outer groove may be the helical groove (**247*a***) that turns in the helical shape in the outer circumferential surface of the first rotating shaft.

Since the flow trajectory of the liquid cooling medium forms a helix, the liquid cooling medium can be uniformly distributed over the outer circumferential surface of the first rotating shaft.

Supplementary Note 7

In the rotating machine according to any one of the supplementary notes 4 to 6, the inner diameter of the liquid feed path may gradually increase as the liquid feed path is closer to the first engaging portion.

When the first rotating shaft rotates, a centrifugal force acts on the liquid cooling medium flowing through the liquid feed path. When the liquid cooling medium flows from the liquid feed path toward the lubricant flow path, the liquid cooling medium easily moves along the inner circumferential surface of the liquid feed path due to the gradual increase in diameter of the inner circumferential surface of the liquid feed path. Accordingly, it is easy to supply the cooling medium to the lubricant flow path.

Supplementary Note 8

The rotating machine according to any one of the supplementary notes 1 to 7 may further include the cooling medium supply device (154) configured to pressure-feed the liquid cooling medium.

Supplementary Note 9

In the rotating machine according to the supplementary note 8, the cooling medium supply device may pressure-feed the liquid cooling medium so as to move the liquid cooling medium from the cooling medium flow path toward the lubricant flow path.

The cooling medium supply device applies pressure to the liquid cooling medium and supplies the liquid cooling medium to the cooling medium flow path. Accordingly, the liquid cooling medium can move from the outer circumferential surface of the first rotating shaft to the interior thereof against the centrifugal force. Therefore, the degree of freedom in the flow direction of the liquid cooling medium is large. Therefore, the degree of freedom in the shape of the cooling medium flow path is increased.

Supplementary Note 10

In the rotating machine according to any one of the supplementary notes 1 to 9, the first rotating body may be the rotating electric machine rotor (202) constituting the rotating electric machine (200).

The permanent magnets constituting the rotor of the rotating electric machine can be cooled by the liquid cooling medium flowing through the cooling medium flow path.

Supplementary Note 11

In the rotating machine according to the supplementary note 10, the second rotating body may be the turbine rotor (300) constituting the gas turbine engine (30).

When the turbine rotor rotates, the rotational driving force of the turbine rotor can be transmitted to the first rotating shaft via the second rotating shaft. Therefore, the first rotating shaft rotates together with the second rotating shaft, and electric power is generated in the rotating electric machine.

Supplementary Note 12

In the rotating machine according to supplementary note 11, the turbine rotor may include the output shaft (330), the output shaft being connected to the first rotating shaft via the second rotating shaft.

The second rotating shaft serves as a spacer. Therefore, the rotating electric machine system and the gas turbine engine can be easily combined while avoiding interference of the engine housing with the rotating electrical machine housing.

Supplementary Note 13

In the rotating machine according to any one of the supplementary notes 1 to 12, the liquid cooling medium may be oil (CO).

The oil sufficiently reduces the frictional resistance between the first engaging portion and the second engaging portion and sufficiently cools the first engaging portion and the second engaging portion. That is, oil is suitable as the liquid cooling medium having both the lubricating action and the cooling action.

It should be noted that the present invention is not limited to the disclosure described above, and various additional or alternative configurations could be adopted therein without departing from the essence and gist of the present invention.

The invention claimed is:

1. A rotating machine comprising: a first rotating body including a first rotating shaft; and a second rotating body including a second rotating shaft configured to rotate integrally with the first rotating shaft, wherein the first rotating shaft includes a cooling medium flow path through which a liquid cooling medium flows, a liquid feed path communicating with the cooling medium flow path, and a first engaging portion provided at a first connecting end portion that is one end portion of the first rotating shaft in an axial direction of the first rotating shaft, the second rotating shaft includes a second connecting end portion overlapping the first connecting end portion in a diametrical direction of the first connecting end portion, and a second engaging portion provided at the second connecting end portion, the first engaging portion and the second engaging portion form a connecting portion configured to transmit a rotational driving force between the first rotating shaft and the second rotating shaft, the second engaging portion is engaged with the first engaging portion so as to be relatively slidable in the axial direction, a lubricant flow path is formed between the first engaging portion and the second engaging portion that are engaged with each other, the lubricant flow path communicating with the liquid feed path and through which the liquid cooling medium is allowed to pass as a lubricant, and the liquid feed path is interposed between the cooling medium flow path and the lubricant flow path.

2. The rotating machine according to claim 1, wherein the first engaging portion and the second engaging portion are engaged via a spline connection.

3. The rotating machine according to claim 1, wherein the liquid feed path is formed in an interior of the one end portion of the first rotating shaft, the first connecting end portion is hollow, the second connecting end portion is inserted into the first connecting end portion, the first engaging portion is formed on an inner circumferential surface of the first connecting end portion, and the second engaging portion is formed on an outer circumferential surface of the second connecting end portion.

4. The rotating machine according to claim 3, wherein the cooling medium flow path includes a first flow path formed in an interior of another end portion of the first rotating shaft in the axial direction, a second flow path formed in a side portion of the first rotating shaft, a communication path placing the first flow path and the second flow path in communication with each other, and a relay path placing the second flow path and the liquid feed path in communication with each other, and the communication path and the relay path extend from inside toward an outer circumferential surface of the first rotating shaft in a diametrical direction of the first rotating shaft.

5. The rotating machine according to claim 4, wherein the first rotating body includes a cover member covering an outer circumference of the first rotating shaft, the first rotating shaft including an outer groove in the outer circumferential surface, and the second flow path is formed by covering the outer groove with the cover member.

6. The rotating machine according to claim 5, wherein the outer groove is a helical groove that turns in a helical shape in the outer circumferential surface of the first rotating shaft.

7. The rotating machine according to claim 4, wherein an inner diameter of the liquid feed path gradually increases as the liquid feed path is closer to the first engaging portion.

8. The rotating machine according to claim 1, further comprising a cooling medium supply device configured to pressure-feed the liquid cooling medium.

9. The rotating machine according to claim 8, wherein the cooling medium supply device pressure-feeds the liquid cooling medium so as to move the liquid cooling medium from the cooling medium flow path toward the lubricant flow path.

10. The rotating machine according to claim 1, wherein the first rotating body is a rotating electric machine rotor constituting a rotating electric machine.

11. The rotating machine according to claim 10, wherein the second rotating body is a turbine rotor constituting a gas turbine engine.

12. The rotating machine according to claim 11, wherein the turbine rotor includes an output shaft, the output shaft being connected to the first rotating shaft via the second rotating shaft.

13. The rotating machine according to claim 1, wherein the liquid cooling medium is oil.

* * * * *